United States Patent [19]

Frisch

[11] Patent Number: 4,567,394
[45] Date of Patent: Jan. 28, 1986

[54] ELECTRO-PNEUMATIC SIGNAL CONVERTER

[75] Inventor: Herbert Frisch, Vienna, Austria

[73] Assignee: ENFO Grundlagenforschungs AG, Dottingen, Switzerland

[21] Appl. No.: 569,958

[22] Filed: Jan. 11, 1984

[30] Foreign Application Priority Data

Jan. 13, 1983 [AT] Austria .............................. A 101/83

[51] Int. Cl.[4] ............................................. H01L 41/08
[52] U.S. Cl. .................................... 310/330; 310/317; 310/328
[58] Field of Search ................................ 310/330–332, 310/317, 319, 328

[56] References Cited

U.S. PATENT DOCUMENTS

| | | | |
|---|---|---|---|
| 3,766,415 | 10/1973 | Dame et al. .......................... | 310/328 |
| 3,955,049 | 5/1976 | MacNeill et al. ................ | 310/332 X |
| 4,237,399 | 12/1980 | Sakamoto ......................... | 310/332 X |
| 4,333,029 | 6/1982 | Kolm et al. ....................... | 310/332 X |
| 4,450,375 | 5/1984 | Siegal .............................. | 310/332 X |

FOREIGN PATENT DOCUMENTS

| | | | |
|---|---|---|---|
| 2537760 | 3/1977 | Fed. Rep. of Germany ...... | 310/322 |
| 122273 | 3/1977 | Fed. Rep. of Germany . | |

OTHER PUBLICATIONS

High-Speed Pulsed Valve Based on a Bimorph Piezo-electric Element by Garnov et al., *Instrum & Exp. Tech.* (USA) vol. 23, No. 4, pp. 165-168, Aug. 1980.

Drop Generator Crystal Drive Adjustment by G. Golicic, *IBM Technical Disclosure Bulletin*, vol. 21, No. 5, Oct. 1978, pp. 1949-1950.

*Primary Examiner*—Mark O. Budd
*Attorney, Agent, or Firm*—Watson, Cole, Grindle & Watson

[57] ABSTRACT

An electro-pneumatic signal converter, having a piezo-electric bending element (1) which bends when an electrical voltage is applied and controls a pneumatic signal transmitter. The piezo-electric bending element (1) is securely clamped in a sealed transmitter casing (4) and controls an air inlet seating (7) and an air outlet seating (8) which are inserted opposite one another in the transmitter casing (4). In the absence of electrical voltage the piezo-electric bending element (1) bears against the air inlet seating (7), against which it is pretensioned. When a voltage is applied, it separates from the air inlet seating (7) and closes the air outlet seating (8). The respective pneumatic signal is taken off on a signal output (10) which is led out of the sealed space (9) of the transmitter casing.

9 Claims, 3 Drawing Figures

ELECTRO-PNEUMATIC SIGNAL CONVERTER

DESCRIPTION

BACKGROUND OF THE INVENTION

The invention relates to an electro-pneumatic signal converter, having a piezo-electric bending element which bends when an electrical voltage is applied and controls a pneumatic signal transmitter.

For the electrical actuation of pneumatic circuits or pneumatic appliances solenoid valves are used practically exclusively. When an electrical voltage is applied the magnet coil draws an armature against the force of a return spring, and the armature actuates a pneumatic control valve. When the voltage is switched off the return spring causes the control valve to be restored to the rest position. The said solenoid valves are relatively robust and have proved successful many times in practice. In comparison with electronic circuits, however, the solenoid valves operate relatively slowly, as a magnetic field must be produced before the switching motion is performed. In addition, they have a high energy requirement since the excited magnet coil has a continuous energy consumption and produces heat. The solenoid valves can therefore often only be integrated in modern control devices with difficulty.

The International Application 80/01826 discloses an electro-pneumatic signal converter with a tongue-shaped piezo-electric bending element which at one end is firmly clamped and at the other end controls the output of a pneumatic nozzle. As in the case of the known mechanico-pneumatic signal converters with a deflecting plate controlling the nozzle, a choke is arranged upstream of the nozzle so that the pneumatic pressure in the space between the nozzle and the choke is altered according to the deflection of the piezo-electric bending element. This known signal converter thus produces a pneumatic output signal which is proportional to the voltage applied to the piezo-electric bending element. The disadvantage of this is that the nozzle has a continuous air consumption and operation can only take place with low pressures and pressure fluctuations. The electrical and pneumatic circuit complexity required for the practical application of this device is therefore relatively substantial.

Electro-pneumatic signal converters are already known in which the pneumatic valves are controlled with the aid of piezo elements which are joined to form columns and which are prolonged or shortened in the axial direction when electrical voltages are applied. In these designs a substantial mechanical effort is necessary for transmitting the mechanical control movements, as tolerances take effect more intensively in manufacture and lead to inaccuracies in control. In addition, the function of the converter is impaired by heat expansion of the piezo-electric columns.

The object of the invention is to improve the hitherto known electro-pneumatic signal converters in such a way that they have a smaller power requirement and operate without significant energy consumption, and they should also be simple to produce and robust in operation.

SUMMARY OF THE INVENTION

This object is attained according to the invention in that the piezo-electric bending element is securely clamped in a sealed transmitter casing, from which a signal output issues, and controls an air inlet seating and an air outlet seating which are inserted opposite one another in the transmitter casing, the piezo-electric bending element being pretensioned against the air inlet seating and, in the absence of electrical voltage, bearing on the latter in a sealing manner and on the other hand, when an electrical voltage is applied, separating from the air inlet seating, bending towards the air outlet seating and closing the latter. A signal converter designed in this way is simply constructed and correspondingly operationally reliable. Compared with the known solenoid valves which may be completely replaced by the signal converter according to the invention, the latter is characterized by a short response time, a minimal power consumption, the absence of heating during operation and by direct controllability by electronic units, so that the field of application of the signal converter according to the invention is essentially wider than that of conventional designs.

In a preferred embodiment of the invention the piezo-electric bending element, which for example may consist of a lamina or a plurality of laminae or discs of piezo-ceramic material, is centred in the transmitter casing and, in a clamping area remote from the air inlet seating and the air outlet seating, is pressed against a contact surface of the transmitter casing by a spring member, for example a spring or an O-ring of rubber or plastics material. It is then unnecessary to clamp the bending element securely in the casing and the precise observation of manufacturing tolerances is also dispensed with. In addition, no solderings are required on the piezo-electric bending element which might cause local depolarization and hence a reduction of the deflexion of the bending element when a certain electrical voltage is applied.

The piezo-electric bending element may be pretensioned against the air inlet seating by a spring which acts upon it and which at the same time is formed as an electrode for the voltage supply. In this connexion only a single electrode in the transmitter casing is necessary for the voltage supply. In addition, the spring compensates possible manufacturing tolerances.

A further development of the signal converter according to the invention may be achieved by a pneumatic pressure controller being arranged upstream of the air inlet seating and an amplifier being connected to the signal output. The pressure controller causes the supply air to be conveyed always at the same pressure, so as reliably to prevent the functioning being adversely affected by fluctuations in the supply air pressure or by an excessive supply air pressure. By using the pressure amplifier only small quantities of air and slight pressures are necessary at the signal output.

The piezo-electric bending element, the pressure controller and the amplifier may be assembled in a common converter casing in which the transmitter casing is interchangeably clamped in the form of a capsule. The signal converter according to the invention then comprises a single completely operative apparatus, which may then also have a common supply air connexion for the pressure controller and the amplifier.

Finally an extension of the area of application of the signal converter according to the invention may also be achieved by a voltage-limiting circuit, e.g. a Zener diode, and possibly also a rectifier, which are preferably inserted in the common converter casing, e.g. in a cover thereof, being arranged upstream of the piezo-electric bending element. This relatively simple arrangement allows the same signal converter to be used for practically all voltages which occur, as excessively high voltages are reduced by the voltage limitation provided. Since only low intensities of current are required for actuating the signal converter according to the invention, this is possible without difficulties, in particular without the injurious formation of heat.

BRIEF DESCRIPTION OF THE DRAWINGS

Examples of embodiment of the invention are illustrated in the drawings, in which.

DESCRIPTION OF THE PREFERRED EMBODIMENT

Figure 1:
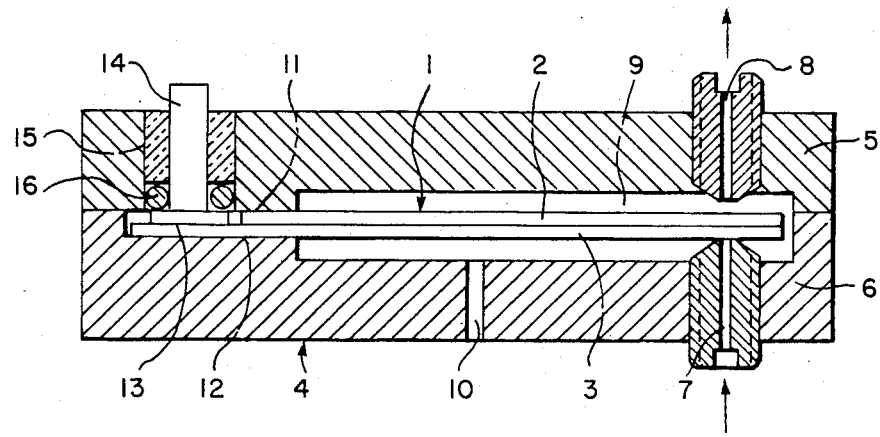
FIG. 1 is an embodiment of the signal converter according to the invention in a longitudinal section through the piezo-electric bending element.

As is evident from FIG. 1 in particular, the piezo-electric bending element 1 in the example of embodiment is formed by a so-called "bimorph" and consists of two tongues 2 and 3 of piezo-electric material, for example of piezo-ceramic material, which are securely joined together. The two tongues 2 and 3 are clamped in the vicinity of one of their ends in a transmitter casing 4 between two casing halves 5 and 6. The other end of the piezo-electric bending element 1 is disposed between an air inlet seating 7 and an air outlet seating 8, which are adjustably screwed into the two casing halves 5 and 6. The two casing halves 5 and 6 bear closely against one another and form in their interior a sealed space 9 from which a signal output 10 issues. At the clamping positions 11 and 12 the casing halves 5 and 6 are in the form of contact surfaces for applying an electrical voltage to the piezo-electric bending element 1. In addition, tongue 3 is made longer at the clamped end than tongue 2, so that a further contact surface 13, against which a contact pin 14 bears, is provided at that point. The said contact pin 14 passes through an insulating sleeve 15 in a bore in casing half 5, in which it is sealed by an O-ring 16 which at the same time presses the contact pin 14 against the contact surface 13 of tongue 3 by way of an enlarged head portion of the said contact pin 14.

The piezo-electric bending element 1 is mechanically pretensioned against the air inlet seating 7 so that it will bear against the said air inlet seating 7 in a sealed manner in the absence of an electrical voltage. In this way the supply air, which is conveyed to the air inlet seating 7 by way of a supply air duct (not shown), is prevented from flowing into the space 9. The signal output 10 is vented to the open air through the open air outlet seating 8. As soon as a direct-current voltage is applied to the piezo-electric bending element 1, namely by way of the transmitter casing 4 and the clamping positions 11 and 12 on the one hand and by way of the contact pin 14 and the contact surface 13 on the other, the bending element 1 bends away from the air inlet seating 7 towards the air outlet seating 8 and closes the latter. The compressed air now flowing through the air inlet seating 7 passes through the space 9 to the signal output 10, from where it is passed on to a signalling line (not shown). The application of a relatively low voltage to the piezo-electric bending element 1 thus causes a pneumatic output signal to be generated, practically no energy consumption taking place. In addition, the switching over occurs practically without delay. The pretensioning and the necessary bending path of the piezo-electric bending element 1 may be adjusted by screwing the air inlet seating 7 and the air outlet seating 8 into the casing halves 5 and 6 to a suitable extent.

Figure 2:
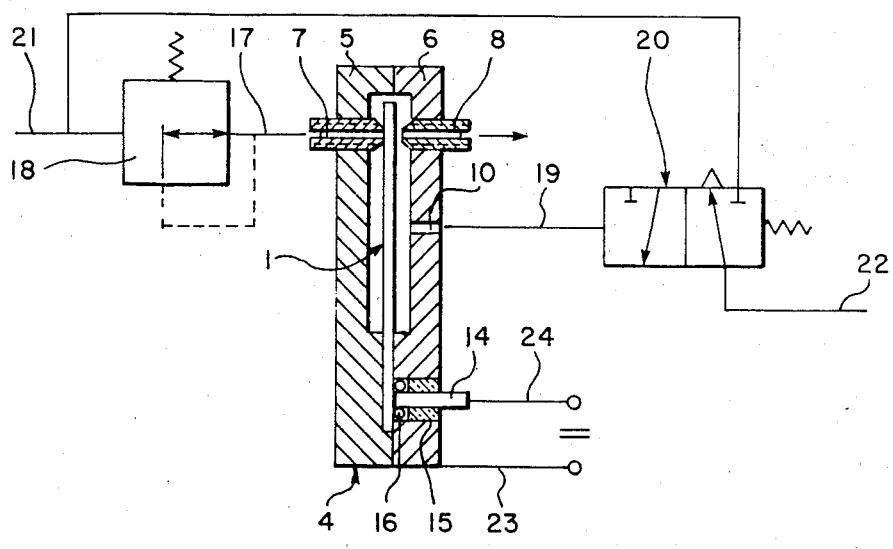
FIG. 2 is a further development of the signal converter in a diagrammatic switching arrangement.

In the switching arrangement according to FIG. 2 a signal converter according to FIG. 1 is used, having a piezo-electric bending element 1 in a casing 4 in which the air inlet seating 7 and the air outlet seating 8 are also provided. A pneumatic pressure controller 18 is connected upstream of the air inlet seating 7 by way of a supply air line 17. On the other side a pressure amplifier 20 is connected to a signalling line 19 coming from the signal output 10. The pressure controller 18 is supplied by pressure feed line 21 which also provides the control signal of pressure amplifier 20 on line 22, actuated in response to the signalling line 19. The electrical voltage signal is supplied to the signal converter by way of conducting wires 23 and 24.

Under off-voltage conditions, even in the case of the circuit arrangement according to FIG. 2, the air inlet seating 7 is sealed by the piezo-electric bending element 1. When an electrical voltage is supplied by way of the conducting wires 23 and 24 the air inlet seating 7 is opened and the air outlet seating 8 is closed, so that a pneumatic signal can pass from the supply air line 17 by way of the signalling line 19 to the pressure amplifier 20. The pressure controller 18 causes the pressure present at the air inlet seating 7 always to be the same irrespective of the pressure in the pressure line 21, for example to have a value of 1 bar. This avoids pressure fluctuations in the air inlet seating 7 and consequent changes in the switching time of the piezo-electric bending element 1. The pressure amplifier 20 amplifies the relatively weak signal fed to it by way of the signalling line 19 and has the effect that there is available in the outgoing control line 22 a signal with the complete pressure prevailing in the pressure line 21 and which may be between 1 bar and for example 16 bar.

Figure 3:
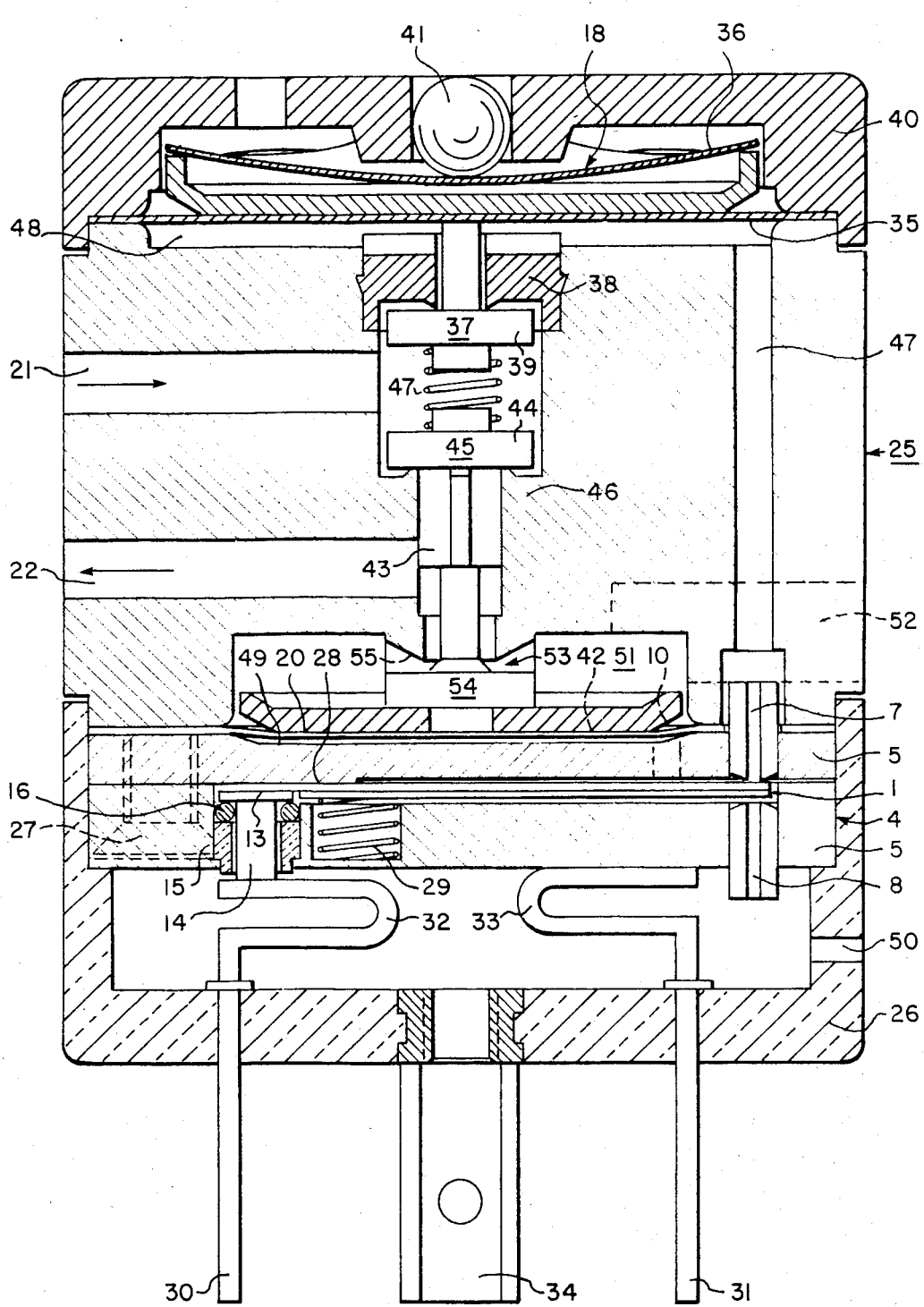
FIG. 3 is a practical embodiment of the signal converter according to FIG. 2 in an axial median section.

In the example of embodiment according to FIG. 3, the piezo-electric bending element 1, the pressure controller 18 and the pressure amplifier 20 are assembled in a common converter casing 25. The transmitter casing 4 with the piezo-electric bending element 1 is in the form of a capsule and is clamped in the converter casing 25 with the aid of a cover 26. The casing halves 5 and 6 of the capsule-shaped transmitter casing 4 are screwed together by countersunk screws, one screw 27 of which is indicated by broken lines. In the example of embodiment according to FIG. 3 the piezo-electric bending element 1 is not clamped between the two casing halves 5 and 6, but is only pressed by spring force against a contact surface 28 of casing half 6. The spring force is supplied by a contact spring 29 which is disposed in a bore in the other casing half 5 and at the same time is also used for transmitting the electrical voltage. Furthermore the end of the resilient bending element 1 is additionally pressed against the contact surface 28 by way of the contact pin 14 through the resilient O-ring 16 acting upon the latter. By this resilient pressing the observation of precise tolerances which is required during clamping becomes unnecessary. The contact spring 29 may also be used for attaining or for supporting the pretensioning force with which the piezo-electric bending element 1 bears against the air inlet seating 7 under off-voltage conditions. In order to supply the electrical voltage, contact pins 30 and 31 are provided which pass through the cover 26 preferably consisting of insulating material and are connected by means of spiral springs 32 and 33 provided at their ends to the contact pin 14 or the transmitter casing 4 respectively. In addition, an extension 34 for securing an attachment plug is disposed on the cover 26 Alternatively the spring 29 may be used to supply electrical voltage to the element 1.

The pressure controller 18 is disposed in the upper part of the converter casing 25 and consists of a diaphragm 35, which is held by a spring 36, and a control valve 37 with a valve seating 38 and a sealing member 39. A sphere 41 gripped in a bore in a casing cover 40 holds the spring 36. The pressure amplifier 20 likewise comprises a diaphragm 42 which is gripped in the converter casing 25 and which actuates the sealing member 44 of an amplifier valve 45 by way of a push-rod 43. The valve seating of the amplifier valve is designated 46. The sealing member 39 of the pressure controller 18 and the sealing member 44 of the pressure amplifier 45 are situated on the same axis and have a common valve spring 47.

A pressure medium at any desired pressure is conveyed to the signal converter by way of the common pressure feed line 21. The spring 36 holds the control valve 37 of the pressure controller 18 open at first, so that pressure medium may pass from the pressure feed line 21 first through the valve seating 38 and into the space 48 below the diaphragm 35. As soon as the pressure preset by the control spring 36 has been attained in the space 48, the control valve 37 closes, so that the same pressure is always maintained in the space 48. This pressure is also present, by way of the supply air line 47, at the air inlet seating 7 which is closed off by the pretensioned piezo-electric bending element 1. The amplifier valve 45 is closed, so that no pressure medium can penetrate into the control line 22. The space 49 below the amplifier diaphragm 42 is relieved of pressure by way of the signal output 10, the open air outlet seating 8 and a ventilating bore 50 in the cover 26. A permanently open ventilating duct 52 leads from the space 51 above the diaphragm 42 to the open air. The control line 22 is also relieved of pressure by the said ventilating duct 52 and by a relief valve 53 with the sealing member 54 and the valve seating 55.

As soon as an electrical voltage is supplied to the piezo-electric bending element 1 by way of the two contact pins 30 and 31, the bending element 1 rises from the air inlet seating 7 and closes the air outlet seating 8. Pressure medium at the constant pressure preset by the pressure controller then passes through the now open are inlet seating 7 through the signal output 10 into the space 49 below the diaphragm 42 of the pressure amplifier, where a pressure builds up. The latter acts upon the sealing member 44 by way of the push-rod 43 and opens the amplifier valve 45 against the force of the spring 47. At the same time the sealing member 54 is pressed against the valve seating 55 and so the relief valve 53 is closed. In this way the connexion between the common pressure feed line 21 and the control line 22 is opened, so that an amplified pneumatic pressure signal is obtained as a result of the supplied electrical voltage signal. This pressure signal remains until the voltage is switched off at the piezo-electric bending element 1 or is reversed, whereupon the bending element 1 again rests against the air inlet seating 7 and closes it. At the same time the air outlet seating 8 is opened, so that the pressure medium is vented out of the space 49 below the diaphragm 42 through the signal output 10, the air outlet seating 8 and the ventilating bore 50. The sealing member 44 is then pressed against the valve seating 46 by the valve spring 47, so that the amplifier valve 45 is closed. At the same time the relief valve 53 is opened, so that the control line 22 is likewise relieved of pressure by the valve seating 55, the space 51 and the ventilating duct 52.

Within the framework of the invention various modifications of the examples of embodiment illustrated are possible. In particular the piezo-electric bending element 1 may be made in various ways, for example it may consist of a single tongue-shaped, disc-shaped or plate-shaped member of piezo-electric material or it may also be made up of a plurality of such members. Additional devices may be provided, in particular a voltage-limiting circuit between the two voltage feed lines to the piezo-electric bending element, so that the signal converter according to the invention may be used independently of the voltage, provided that the signal voltage merely exceeds a specific minimum value. If a rectifier is additionally connected upstream, direct-current voltages or alternating-current voltages may also optionally be supplied.

We claim:

1. An electro-pneumatic signal converter, comprising a sealed casing having an air inlet thereto, an air outlet therefrom opposite said air inlet, both with a seating, and a signal output therefrom, a piezoelectric bending element which bends when an electrical voltage is applied to the signal converter, the bending element being securely clamped in a clamping area remote from said air inlet and outlet seatings to be centered in said casing and pressed against a contact surface thereof by a spring member controlling the air inlet seating and the air outlet seating to control the passage of air through the signal converter, the bending element being pretensioned against the air inlet seating and, in the absence of electrical voltage, bearing on the latter in a sealing manner, and when an electrical voltage is supplied to the signal converter, separating from the air inlet seating, bending towards the air outlet seating and closing the latter.

2. A signal converter as claimed in claim 1 wherein the bending element is pretensioned against the air inlet seating by a spring which acts upon it and which at the same time is formed as an electrode for the voltage supply to the signal converter.

3. A signal converter as claimed in claim 1 further comprising a pneumatic pressure controller arranged upstream of said air inlet seating and an amplifier connected to said signal output.

4. A signal converter as claimed in claim 3 wherein the sealed casing, the pressure controller and the amplifier are assembled in a common converter casing in which said sealed casing is interchangeably clamped as a capsule.

5. A signal converter as claimed in claim 1, further comprising a voltage-limiting circuit for applying said electrical voltage to said bending element.

6. A signal converter as claimed in claim 5 wherein the voltage-limiting circuit comprises a rectifier.

7. A signal converter as claimed in claim 5 wherein the voltage limiting circuit is located in the common converter casing.

8. A signal converter as claimed in claim 1 wherein said bending element comprises at least one lamina of piezo-ceramic material.

9. A signal converter as claimed in claim 1 wherein said spring member comprises an O-ring of resilient material.

* * * * *